(12) United States Patent
Veltri et al.

(10) Patent No.: US 7,575,671 B2
(45) Date of Patent: Aug. 18, 2009

(54) MONITORING PORT ASSEMBLY FOR FLUID TREATMENT SYSTEMS

(75) Inventors: Jeffrey A. Veltri, Burlington (CA); Michael P. Sarchese, Guelph (CA); Ana-Maria Bogatan, Waterloo (CA)

(73) Assignee: R-Can Environmental Inc., Guelph, Ontario (CA)

( * ) Notice: Subject to any disclaimer, the term of this patent is extended or adjusted under 35 U.S.C. 154(b) by 658 days.

(21) Appl. No.: 11/362,129

(22) Filed: Feb. 27, 2006

(65) Prior Publication Data

US 2006/0191825 A1 Aug. 31, 2006

Related U.S. Application Data

(60) Provisional application No. 60/655,881, filed on Feb. 25, 2005.

(51) Int. Cl.
*B01D 17/12* (2006.01)
(52) U.S. Cl. ............... 210/85; 73/866.5; 96/417; 210/94; 210/192; 422/186.3
(58) Field of Classification Search ............... 210/85, 210/91, 94, 96.1, 192, 748; 96/224, 417, 96/418; 422/24, 82.05, 186.2, 186.3; 250/435, 250/536; 73/61.48, 866.5; 378/77, 78
See application file for complete search history.

(56) References Cited

U.S. PATENT DOCUMENTS

| | | | | |
|---|---|---|---|---|
| 2,377,862 A | * | 6/1945 | Bond | 378/78 |
| 2,847,579 A | * | 8/1958 | Allen et al. | 378/77 |
| 4,427,891 A | * | 1/1984 | Georges et al. | 250/443.1 |
| 4,438,647 A | | 3/1984 | Ozaki et al. | |
| 6,451,202 B1 | * | 9/2002 | Kuennen et al. | 210/136 |
| 6,830,697 B1 | | 12/2004 | Pearcey | |
| 2004/0061069 A1 | * | 4/2004 | Schalble et al. | 250/432 R |

FOREIGN PATENT DOCUMENTS

| | | |
|---|---|---|
| JP | 2001305053 | 10/2001 |
| SE | 0004386 A | 10/2001 |
| WO | 9201218 | 1/1992 |

* cited by examiner

*Primary Examiner*—Joseph W Drodge
(74) *Attorney, Agent, or Firm*—Leslie A. Kinsman; Borden Ladner Gervais LLP

(57) ABSTRACT

A monitoring port assembly for a fluid treatment system, such as for use in an ultra-violet water treatment system. The port assembly comprises a sensor port cup having a port for access to an interior of the fluid treatment vessel. The port is offset from the central axis of the sensor port cup. A cylindrical body, having an offset through-hole to receive a sensor assembly, is disposed within the sensor port cup for rotational movement about the central longitudinal axis between an operational position where the offset through-hole is aligned and coincident with the port, and a servicing position where the offset through-hole is displaced relative to the port. Sensors can be safely and conveniently removed from or installed into a port in the fluid treatment vessel by rotating the cylindrical body from the servicing to the operational position.

19 Claims, 4 Drawing Sheets

MONITORING PORT ASSEMBLY FOR FLUID TREATMENT SYSTEMS

CROSS REFERENCE TO RELATED APPLICATIONS

This application claims the benefit of priority of U.S. Provisional Patent Application No. 60/655,881 filed Feb. 25, 2005, which is incorporated herein by reference in its entirety.

FIELD OF THE INVENTION

The present invention relates generally to fluid treatment systems. More particularly, the present invention relates to a rotating monitoring port assembly for fluid treatment systems.

BACKGROUND OF THE INVENTION

It can be appreciated that fluid treatment systems with one or more monitoring ports have been in use for years. Existing products commonly found in the market-place include air and water treatment devices utilizing ultraviolet light (UV) as a means to inactivate, reduce, eliminate, convert, or destroy some portion of undesirable contaminant within the fluid being treated. Other products commonly found in the market-place include vapor and liquid processing systems utilizing UV light as a means to cause or enhance a chemical reaction within the fluid being processed. The use of UV as a useful agent for the aforementioned purposes has been well demonstrated and documented in the art.

One of the factors that determines the effectiveness or capacity of such treatment and processing systems is the amount of UV light passing through the fluid, and since that amount can be adversely affected by one or more factors it is useful to have at least one sensor for indicating the amount of UV within the fluid treatment zone: such sensors typically measure the rate of UV energy falling on a surface area within the fluid treatment zone, with units of power per unit area (eg: Watts per square centimeter abbreviated as W/sq.cm). Information emanating from such fluid treatment process sensors can be used to either manually or automatically control the process or signal an alarm as to a deficiency in the process.

Common UV sensors typically install into a port in a fluid treatment vessel and utilize a window made from material that is transparent to UV light, for example quartz glass, sealed to prevent fluid from escaping the vessel and to isolate the fluid being treated from a UV sensing element and its related electronic signal processing components. The UV-transparent window may be fixed in a sealed manner to a treatment vessel's UV monitoring port so that a sensor may be removed without risk of fluid escaping the through the empty port, or the sensor may contain its own integral sealing window so that the port does not require a fixed window.

Systems are also known in the art which utilize multiple UV-transparent windows: for example one transparent window sealingly fixed to the monitoring port and at least one additional window integral with the sensor. UV light from within the fluid treatment zone passes through a UV-transparent window and falls on a UV sensitive element, such as a photodiode, and the resulting signal from the UV sensitive element will give an indication of the amount of UV light within the treatment zone. Since the signals from common UV-sensitive elements are typically small, they can be amplified, processed, and interpreted by techniques well known in the art. Alternatively, the UV-light may at some point fall on a phosphor-type material that converts the UV light into at least one different wavelength of light which then falls upon a different type of light-sensitive element, but there will still typically be a transparent window between the fluid treatment zone and the light-sensitive element. It is common, although not universally required, to have some form of calibrated reference sensor which can be used periodically to check that the system's regular "duty" UV sensor is functioning properly and providing a signal which corresponds correctly to the amount of UV light. Such reference sensors are often designed such that, after removal of the regular sensor, they can be inserted into the same port as the regular sensor. An additional unique port may be included in the treatment vessel to allow periodic insertion of a reference sensor. The successful monitoring of UV light within a treatment vessel as described above typically requires periodic and thorough cleaning of a transparent window surface in contact with the fluid so as ensure that fouling deposits are not blocking some portion of UV light passing through the window to the UV sensor and causing erroneous low readings from the UV sensor.

The main problem with conventional fluid treatment system monitoring ports that do not include a sealingly fixed barrier, such as a transparent window in a UV monitoring port, between the fluid and sensor is that in order to remove the sensor for periodic cleaning, calibration, other maintenance, or to insert a reference sensor, it is necessary to shut off fluid flow to the treatment vessel or drain some portion of fluid from the vessel so as to prevent undesirable escape of fluid through the empty port. It can be seen that this main problem, specifically the requirement to interrupt the fluid treatment or process to prevent undesirable escape of fluid through the empty monitoring port while performing some sort of sensor maintenance or reference check, persists with ports and sensors intended for monitoring parameters other than UV light.

While conventional UV monitoring ports that do include a sealingly fixed transparent window between the fluid and sensor may allow removal of a sensor while preventing escape of fluid, such arrangements do not provide for convenient access to the window surface in contact with the fluid, and the task of removing such a conventional fixed window invokes the main problem that it is necessary to shut off fluid flow to the treatment vessel and drain some portion of fluid from the vessel.

Another problem with conventional fluid treatment systems that include multiple UV monitoring ports with each port containing its own sealingly fixed window, is that each window may accumulate a different amount of fouling and invalidate the reading from one or more sensors and hence defeating at least one purpose of having multiple sensors, for example the comparison between a duty sensor and a reference sensor.

Yet another problem with conventional UV monitoring ports is that when the sensor has been removed it may be possible to expose a nearby person to harmful UV radiation emanating from within the treatment vessel and passing through the sensor port.

While these conventional devices may be suitable for the particular purpose to which they address, they are cumbersome with respect to maintenance activities that include removal of a surface or element in contact with the fluid being treated, as interruption of flow to or draining of fluid from the treatment vessel is required to prevent inadvertent escape of fluid through the monitoring port.

It is, therefore, desirable to provide a novel rotating monitoring port assembly for a fluid treatment system.

SUMMARY OF THE INVENTION

The present invention relates generally to a fluid treatment system monitoring port and more specifically it relates to a rotating monitoring port assembly for fluid treatment systems for allowing a sensor to be safely and conveniently removed from or installed into a port of a fluid treatment vessel. The invention also reduces or prevents inadvertent escape of fluid through the port, without requiring a window fixed to the port to contain the fluid within the treatment vessel, without requiring the interruption of flow to or draining of fluid from the treatment vessel, and preventing potential exposure of nearby persons to harmful UV light. The invention also allows the interchanging of sensors, for example UV duty and reference sensors, in the same port in a fluid treatment vessel. The invention also allows removal from a fluid treatment vessel of a transparent window at a sensor tip with a surface in contact with the fluid being treated. The rotating monitoring port assembly also prevents inadvertent injury or equipment damage when removing a UV sensor from a fluid treatment chamber that is pressurized.

In a first aspect, the present invention provides a monitoring port assembly for a fluid treatment vessel, such as for use in an ultra-violet water treatment system. The port assembly comprises a sensor port cup having a port for access to an interior of the fluid treatment vessel. The port is offset from a central longitudinal axis of the sensor port cup. A cylindrical body, having an offset through-hole to receive a sensor assembly, is disposed within the sensor port cup for rotational movement about the central longitudinal axis between an operational position where the offset through-hole is aligned and coincident with the port, and a servicing position where the offset through-hole is displaced relative to the port and the cylindrical body sealingly engages the sensor port cup to prevent fluid egress from the fluid treatment vessel.

Embodiments of the port assembly can further comprise a keyed plate having a keying structure aligned with the port to permit insertion or removal of the sensor assembly when the cylindrical body is in the servicing position. The keyed plate can be an annular plate fixed to an upper surface of the sensor port cup, and the keying structure can be a cutout in the inner circumference of the annular plate. The keyed plate can also retainingly overlap a flange of the sensor assembly when the cylindrical body is in the operational position. In a presently preferred embodiment, the through-hole is threaded to cooperate with a threaded exterior of the sensor assembly. A handle can be fixed to the cylindrical body to assist in rotating the body relative to the cup. The handle and sensor port cup can also include cooperating means, such as stops, to positively indicate the operational and servicing positions. The sensor port cup can be bolted or threaded to a fitting in the fluid treatment vessel, or can be integral therewith.

In a further aspect, the present invention provides a sensor assembly for use with the monitoring port assembly. The sensor assembly comprises an insertion portion complementary to an interior profile of the through-hole. The insertion portion can terminate at a sealed sensor tip, and can include a window, such as a quartz window. In one embodiment, the insertion portion has sections of differing diameter decreasing towards the sensor tip. The insertion portion can include a seal to sealingly engage the through-hole when the sensor assembly is partially inserted, and can include a flange. The sensor can be any suitable sensor, such as an UV sensor. The sensor assembly can also include a housing for receiving a calibration sensor.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Generally, the present invention provides a monitoring port assembly for a fluid treatment system, such as for use in an ultra-violet water treatment system. The port assembly comprises a sensor port cup having a port for access to an interior of the fluid treatment vessel. The port is offset from the central axis of the sensor port cup. A cylindrical body, having an offset through-hole to receive a sensor assembly, is disposed within the sensor port cup for rotational movement about the central longitudinal axis between an operational position where the offset through-hole is aligned and coincident with the port, and a servicing position where the offset through-hole is displaced relative to the port.

Figure 1:
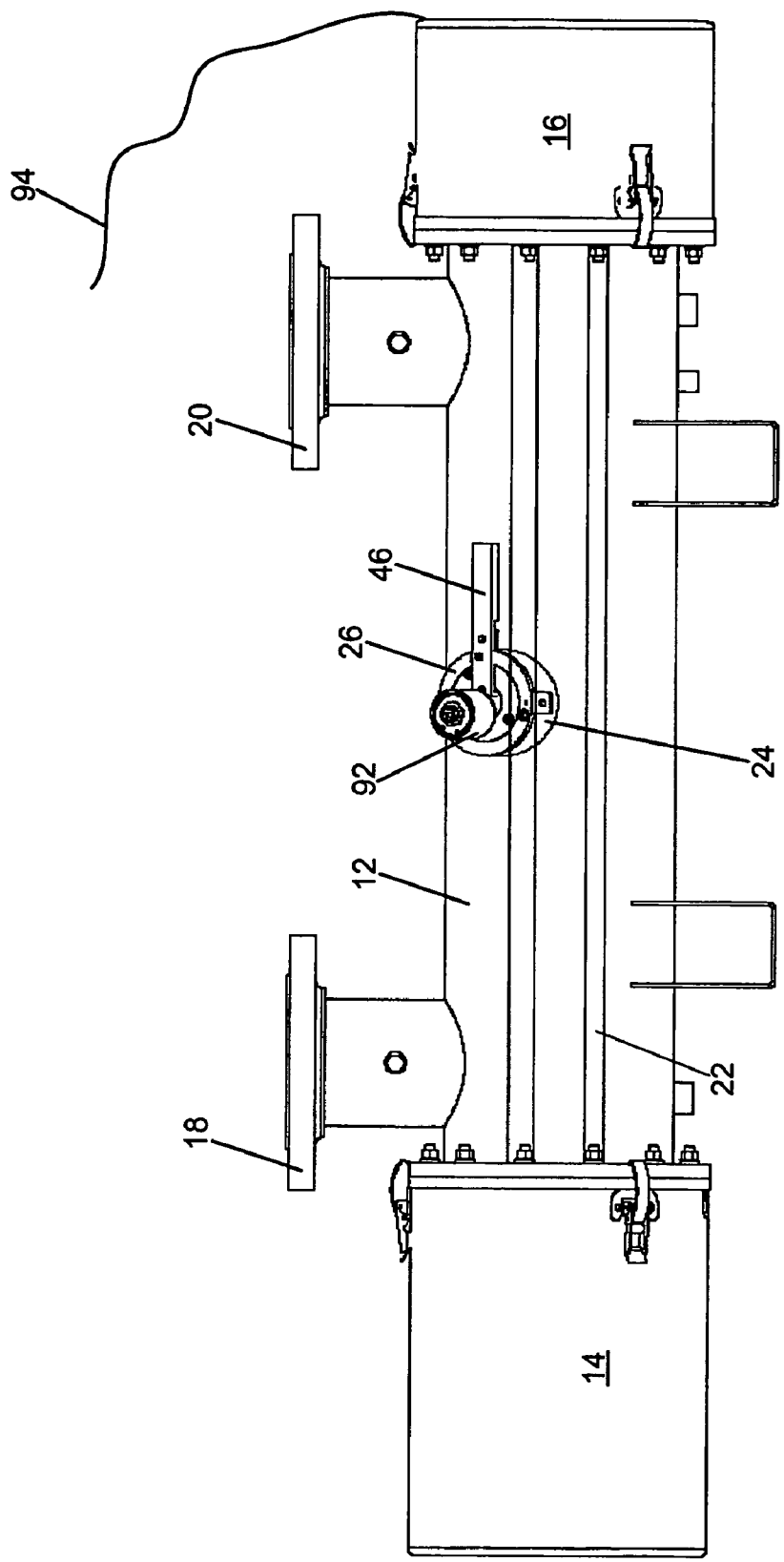
FIG. 1 is a side-view of an ultraviolet fluid treatment system.

Turning to FIG. 1, a view of a fluid treatment system having a rotating monitoring port assembly is provided. The system 10 comprises an ultraviolet (UV) reactor chamber comprising a cylindrical treatment vessel 12, sealed at each end by flange plates 14 and 16, with an inlet port 18 and an outlet port 20 disposed at each end. One or more light emitting assemblies 22 are arranged within and substantially parallel to the treatment vessel 12. Each light emitting assembly 22 preferably includes a mercury vapor UV lamp surrounded by a UV transparent sleeve, such that the assembly is capable of emitting ultraviolet light. Cables 94 connect the fluid treatment system 10 to a processor for controlling operation of the system 10 and to provide power to the light assemblies 22. The cables may also be connected to other means for controlling the system 10. Removable sealing means, such as gland nuts and/or O-rings, are also provided to maintain fluid tight seals between each light emitting assembly 22 and the flange plates 14 and 16. The treatment vessel 12 further comprises at least one fitting 24 which is integral with an opening through a wall of the treatment vessel 12. Fitting 24 has suitable means, such as internal threads and a sealing seat, for securing and sealing to an outer surface of a sensor port cup 26.

Figure 2:
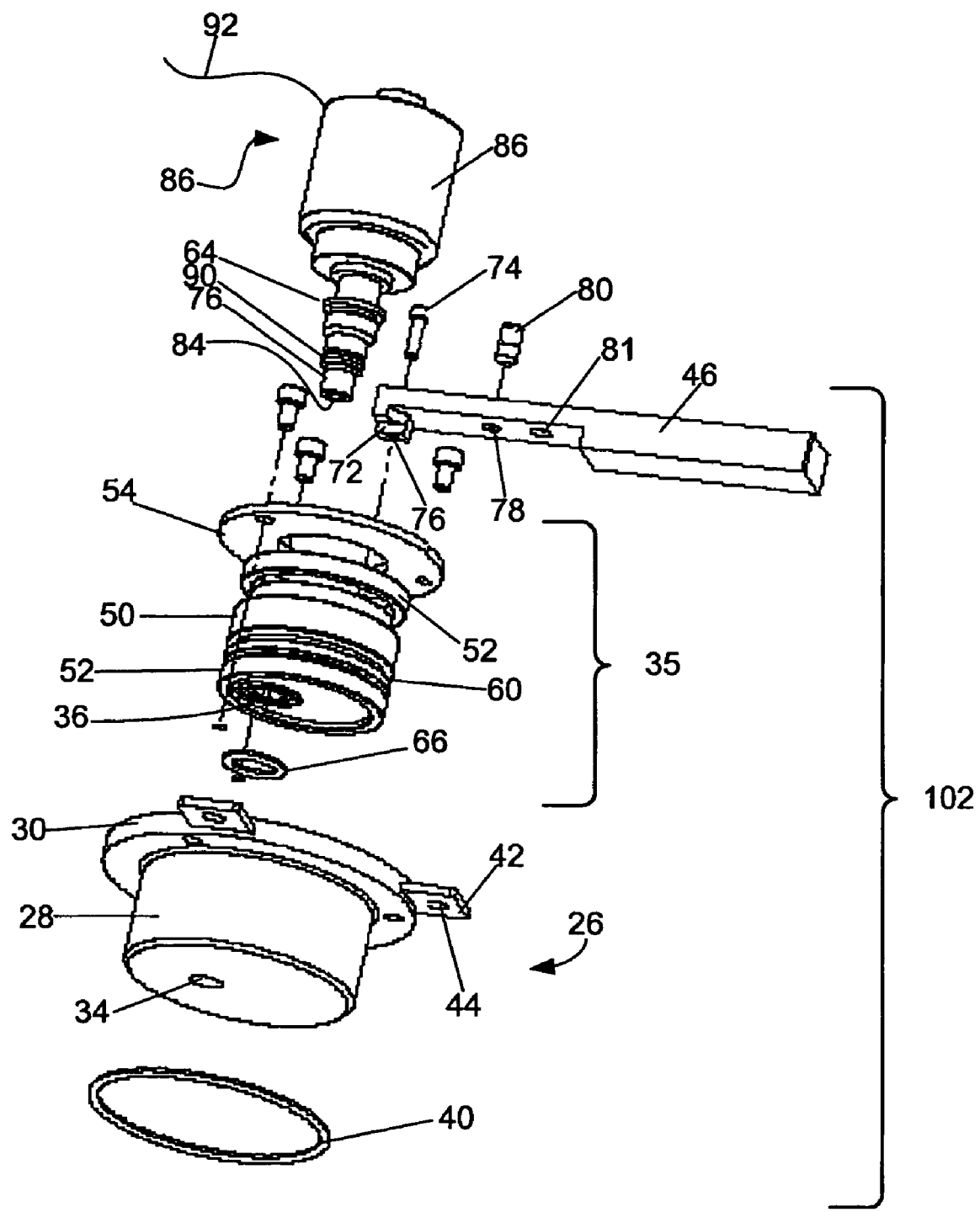
FIG. 2 is an exploded isometric view of a sensor port assembly and sensor in accordance with the invention.

As shown in FIG. 2, the sensor port cup 26 comprises a cylinder 28 having a first end 30 and a second end 32, with the interior of the cylinder portion 28 being partially and concentrically hollowed-out and having at least one smaller diametered, port, or hole, 34 passing completely through the second end 32. The axis of smaller diameter port 34 is parallel to and offset from the longitudinal center axis of a main cylindrical portion 35 by a distance equal to the axis offset distance of hole 36 to the center axis. The outer diameter of the cylinder 28 may include means, such as screw threads, to allow it to be attached to the fitting 24 integral with the fluid treatment vessel 12, or may simply be formed to fit directly within the fitting 24. A sealing means, such as O-ring 40 provides a fluid tight seal between the outer surface of the sensor port cup 26 and the fitting 24. One or more tabs 42 with holes 44 may be integral with the sensor port cup 26 to allow the handle 46 to be locked in specific rotational position relative to sensor port cup 26. These rotational positions are more clearly shown in FIG. 3, a servicing position, and FIG. 4, an operational position. Port 34 typically has a chamfer or radius on an inner surface edge. A groove (not shown) sized to accept retaining ring is cut into the inside cylindrical surface near the first end 30 of sensor port cup 26 to receive the main cylindrical portion 35. The longitudinal depth of the internal hollowed out section of sensor port cup 26, measured between the bottom of the internal hollowed out section and the closest surface of the groove for the retaining ring is slightly greater than the total combined length of a cylindrical body, or rotating disc, 50 assembled with bushings 52 and keyed plate 54. Hollow cylindrical bushings 52 have an outer diameter slightly larger than the largest outside diameter of rotating disc 50 but slightly less than the inside diameter of the smooth hollowed out cavity of sensor port cup 26. The longitudinal length of bushings 52 is such that, when assembled onto the ends of rotating disc 50 they protrude beyond their respective ends of rotating disc 50.

Figure 4:
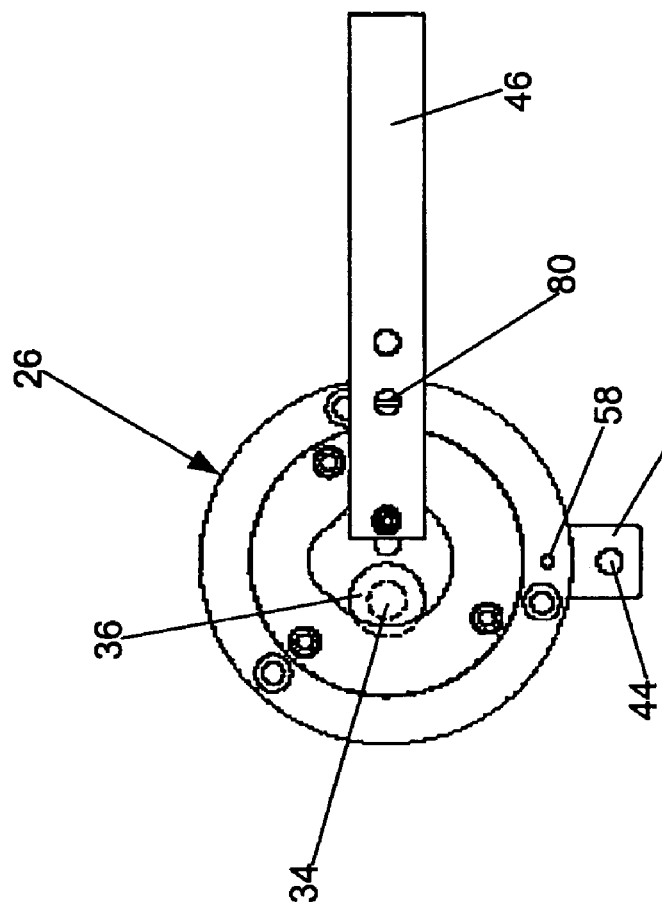
FIG. 4 is a front view of the sensor port assembly in an operational position.
Figure 3:
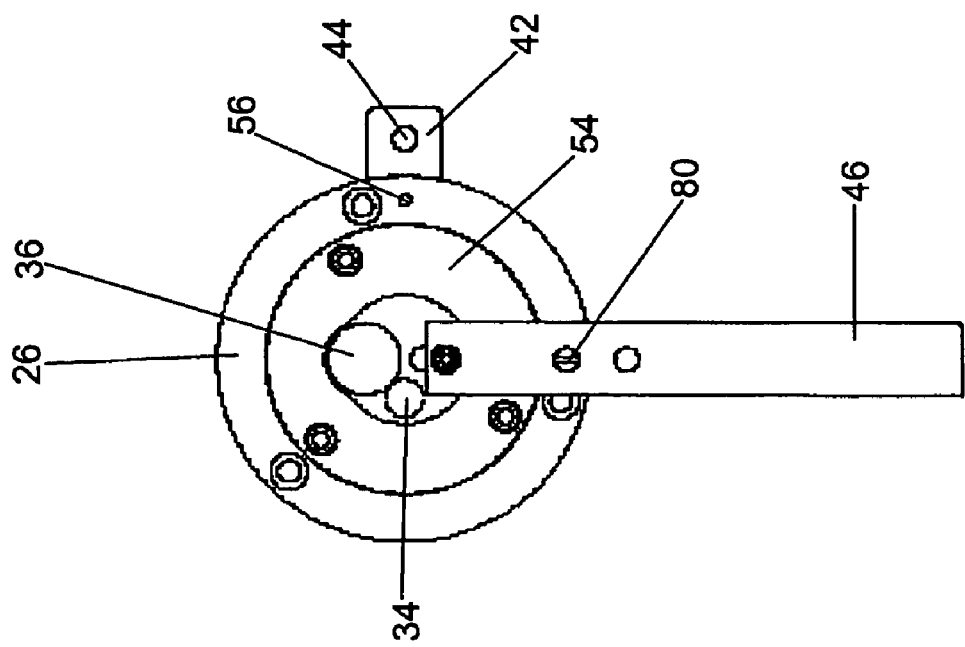
FIG. 3 is a front view of the sensor port assembly in a servicing position.

FIGS. 3 and 4 show indents 56 and 58 in the face of the first end of sensor port cup 26, with these indents 56 and 58 each located at the same radial distance from the longitudinal centerline of sensor port cup 26.

FIG. 2 further shows the cylindrical portion, or rotating disc, 50 having a cylindrical shape with at least two different outside diameters, with the largest outside diameter being less than that the inside diameter of the sensor port cup 26. The largest outside diameter portion of rotating disc 50 is in the middle of the main cylindrical portion 35, and a groove is provided in this region to accept O-ring 60. Each end of rotating disc 50 has a concentric but smaller outside diameter to accept bushings 52. As indicated above, through-hole 36 penetrates completely through rotating disc 50 so as to allow a sensor 68 to penetrate at least to a depth that completely includes ridge 64. The axis-offset distance of through-hole 36 must be at least half of the largest diameter of O-ring 66. The thickness of O-ring 66 is such that the total combined length of rotating disc 50 assembled with bushings 52, keyed plate 54, and uncompressed O-ring 66 is slightly greater than the longitudinal depth of the internal hollowed out section of sensor port cup 26 measured between the bottom of the internal hollowed out section and the closest surface of the retaining ring groove inside sensor port cup 26.

Through-hole 36 contains means, such as internal threads and smooth bore section, to secure and seal sensor assembly 68 in a fluid-tight manner. Ideally the smooth bore sealing portion of hole 36 is of a smaller inside diameter than the internal threaded section, and is longitudinally positioned closer to O-ring 66 than to the threaded section. One end-face of rotating disc 50 has a circular recess concentric with hole 36 and sized appropriately to accept O-ring 66, with the opposite end-face having a rectangular recess 71 to match a keyed protrusion 72 and a blind threaded hole to accept screw 74. Rotating disc 50 may also contain more than one offset through-hole for securing and sealing one or more sensor assemblies.

Handle 46 as shown in FIG. 2 is an elongate structure with one end having the keyed protrusion 72 and through-hole 76 with inside diameter slightly larger than the largest diameter of screw 74. Hole 78 receives a ball plunger 80 but may also be sized to receive a compression spring and spherical ball. The location of hole 78 is such that, when assembled to rotating disc 50, the longitudinal axis of hole 78 is offset from the longitudinal axis of rotating disc 50 by a radial distance equal to that between the longitudinal center line of sensor port cup 26 and center of indent 56 as shown on FIG. 3. Hole 81 is located in handle 46 such that, when assembled to rotating disc 50, the longitudinal axis of hole 81 is offset from the longitudinal axis of rotating disc 50 by a radial distance equal to that between the longitudinal center line of sensor port cup 26 and center of hole 44 as shown in FIG. 2. In addition to the keyed protrusion 72, the screw 74 may be used to rigidly affix handle 46 to rotating disc 50. Alternatively, the screw may serve as the only means for connecting the handle to the rotating disc 50.

FIGS. 2, 3 and 4 show the keyed plate 54 being a thin disc structure having an outer diameter and a concentric inner diameter, with at least one eccentric circular recess 82 in the inner diameter. The outer diameter is sized such that it fits tightly inside the inner diameter of the first end of sensor port cup 26. The center of eccentric recess 82 is offset from the center of the outside diameter by a distance equal to the axis-offset distance of hole 36. The diameter of eccentric circular recess 82 is slightly larger than the diameter of sensor body ridge 64. Alternatively, keyed plate 54 may be arranged with an inside diameter that is eccentric from the outside diameter, or with a non-circular inside recess. Keyed plate 54 may have one or more small holes to accept at least one pin or screw for securing or at least rotationally fixing keyed plate 54 to a matching hole or holes in the first end of sensor cup 26, and if these are used to secure plate 54 to cup 26 then the need for retaining ring and its associated groove are eliminated.

FIG. 2 shows sensor 68 including a hollow elongate cylindrical sensor body 76 with transparent window 84 sealingly affixed to one end and housing 86 affixed to the other end. Integral with the sensor body 76 is the cylindrical concentric ridge 64, which has a diameter larger than any portion of the sensor body 76 between ridge 64 and window 84. The outer diameter of sensor body 76 next to ridge 64 in the direction towards housing 86 is smaller than a portion of sensor body 76 found between ridge 64 and window 84. The distance between the exposed face of window 84 and the furthest surface of ridge 64 should be less than the total combined length of rotating disc 50 with bushings 52. Sensor body 76 includes means, such as external threads 90 and groove with O-ring 88, to secure and seal to the respective threaded and smooth bore sections of hole 36. Ideally the largest diameter of O-ring 88 should be less than the smallest diameter of the internal threads in hole 36, and be longitudinally positioned closer to window 84 compared to threads 90.

Typically, threads 90 provide the largest outer diameter portion of sensor body 76 between ridge 64 and window 84. The sensor housing 86 contains an ultraviolet light sensitive element such as a UV photodiode and necessary electronics for amplifying or processing the photodiode output from the light assemblies 22. Electrical cable 92 transmits required power and signals to and from the electronics contained within housing 86.

As discussed above, FIG. 2 illustrates assembly 102 comprising the sensor port cup 26, into which is placed the rotating disc 50. In one embodiment, the main cylindrical portion 35 may be inserted into the port cup 26 in the following manner. The subassembly of rotating disc 50, O-rings 66 and 60, and bushings 52, is slid into the hollowed out portion of sensor cup 26. Keyed plate 54 is then pressed into the sensor port cup 26 such that eccentric recess 82 is rotated about the main longitudinal axis by an amount preferably at least 90 degrees away from hole 34. A retaining ring is installed so as to engage in a matching groove cut into the inside cylindrical surface near the first end of sensor port cup 26, and thereby mechanically retain the aforementioned components and ensure that O-ring 66 is compressed against the smooth inner bottom surface of the hollowed out section of sensor cup 26. In this manner compressed O-ring 66 forms a fluid tight seal between groove 70 and the bottom of the smooth hollowed out cavity of sensor port cup 26. O-ring 60 is sized to form a fluid tight seal between its groove in the outer surface of rotating disc 50 and the smooth inside diameter surface of sensor port cup 26.

The keyed protrusion 72 of the handle 46 must be aligned with a matching recess in the face of rotating disc 50 to provide a rigid connection between these two components. Handle 46, ball plunger 80 and rotating disc 50 with O-ring 66 are able to rotate relative to sensor port cup 26 about the main longitudinal cylindrical axis of the assembly. Once assembled, keyed plate 54 is restricted from rotation relative to the sensor port cup 26. This may be accomplished via pin or screw (not shown).

The assembly 102 is then mounted into fitting 24 on treatment vessel 12 as shown in FIG. 1, such that sensor port cup 26 becomes sealingly affixed to the fitting 24. Referring back to FIG. 2, O-ring 40 provides a fluid tight seal between fitting 24 and sensor port cup 26. It will be understood that the sensor port cup 26 may be installed into fitting 24 prior to assembly with parts of the main cylindrical portion 35, such as the rotating disc. When the longitudinal axis of through-hole 36 is aligned with the center of eccentric recess 82 in keyed plate 54 as shown in FIG. 3, the sensor assembly 68 may be installed into, or removed from, through-hole 36.

Referring back to FIG. 2, sensor 68 has external threads 88 that mate with internal threads inside through-hole 36 and provide mechanical securing of sensor 68 to rotating disc 50. O-ring 88 provides a liquid tight seal between sensor body 76 and a smooth section of the inside diameter of through-hole 36 in rotating disc 50. With this rotational alignment of through-hole 36 with the center of eccentric recess 82, sensor 68 may be threaded into assembly 102 to a depth such that ridge 64 passes completely through eccentric recess 82 in keyed plate 54. Again referring to FIG. 2, once sensor assembly 68 is installed to such depth where ridge 64 has passed completely through keyed plate 54, the handle 46 may then be used to rotate the ball plunger 80, and rotating disc 50 with O-ring 66 relative to sensor port cup 26 about the main longitudinal cylindrical axis of the assembly. This rotation can be continued at least to the degree that the longitudinal center axis of hole 36 (which is coincident with the longitudinal center axis of sensor assembly 68) is aligned with the center of hole 34 as shown in FIG. 4. This may be accomplished via a 90 degree or 180 degree rotation of the handle. With this rotational alignment of through-hole 36 with hole 34, sensor 68 may be threaded from its aforementioned position further into rotating disc 50 such that window 84 protrudes completely or partially through hole 34 as required for monitoring the amount of UV light in the treatment vessel 12. In a preferred embodiment, a positive depth stop is provided so that sensor 68 can be threaded into disc 50 to an optimum depth for monitoring. With sensor assembly 68 threaded into disc 50 such that window 84 protrudes at least partially through hole 34, it is not possible to rotate handle 46 or any of the components attached to handle 46 relative to sensor port cup 26. In the operational position of FIG. 4, or in fact any rotational orientation other than the servicing position of FIG. 3, it is not possible to remove the sensor 68 from assembly 102 due to interference between the keyed plate 54 and ridge 64.

As shown in FIG. 2, at least one tab 42 with hole 44 is integral with sensor port cup 26, positioned so as to align with hole 81 in handle 46 at a specific rotational orientation of handle 46 (and its attached components) relative to sensor port cup 26. When hole 44 is aligned with hole 81, a pin, bolt, or locking bar may be used to fix the rotational orientation of handle 46 (and its attached components) relative to sensor port cup 26. FIGS. 3 and 4 show indents 56 and 58 positioned in the face of sensor port cup 26 which engage spherical ball 84 when handle 46 is at either of the positions shown in FIG. 3 or 4. Some slight additional rotating force is required to be exerted against handle 46 in order to disengage ball 82 from either indent 56 or 58, and in this manner there is some positive indication that the rotating disc 50 has been oriented to either of the servicing or operational positions.

Figures 5, 6:
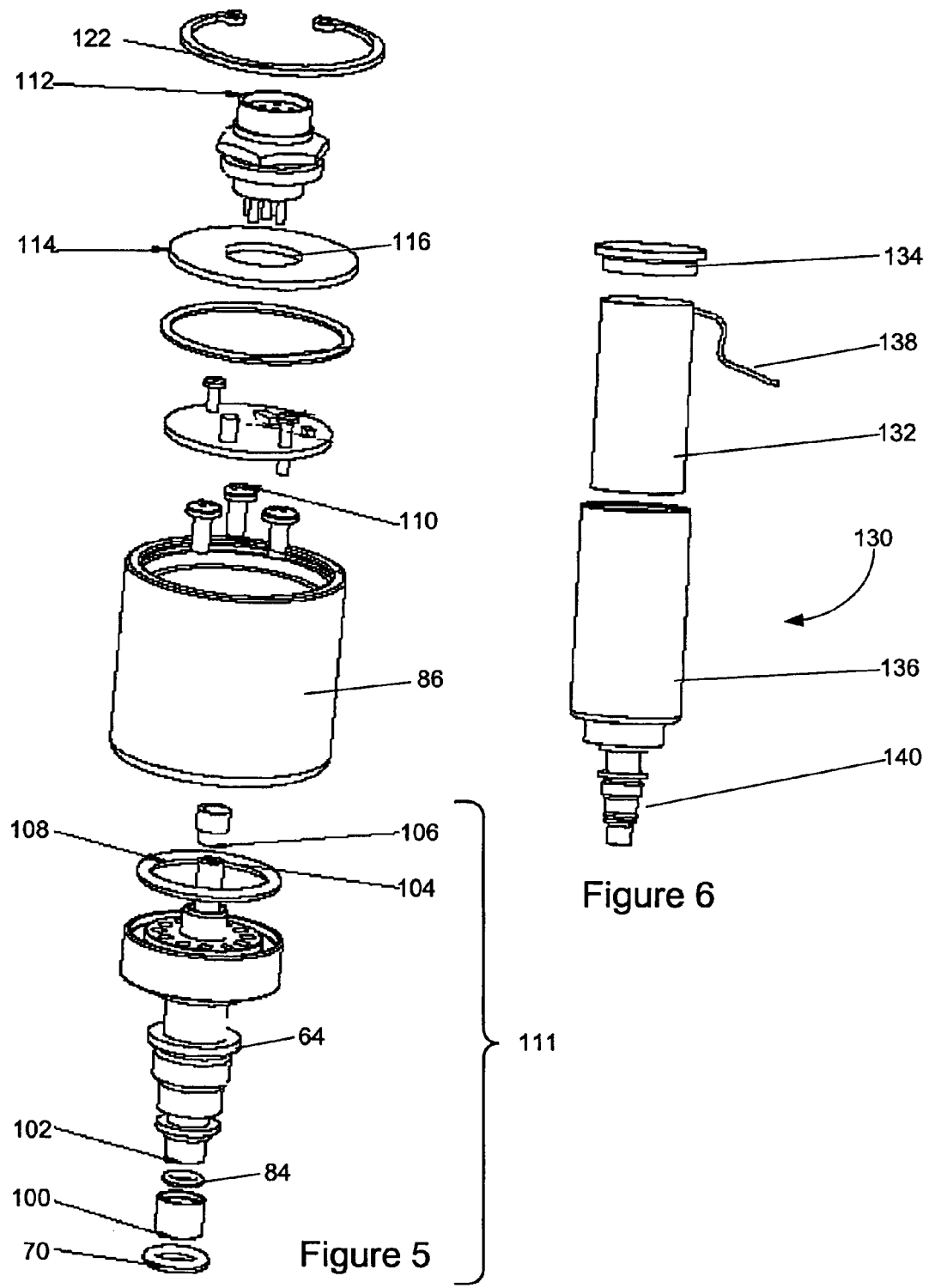
FIG. 5 is an exploded view of a sensor assembly.
FIG. 6 is a view of a sensor sleeve.

FIG. 5 provides an exploded view of an embodiment of a sensor 68 for use with the rotating monitoring port assembly. The sensor 68 comprises the O-ring 90 which is mounted over a UV cap, or sealed sensor tip, 100 and UV body 102. Between the cap 100 and the body 102 is the window 84. The sensor 68 further comprises a quartz tube 104 centrally located and housed within the sensor body. At one end, the quartz tube 104 is the window 84 and at the other end is a coupling 106 for connecting the quartz tube 104 with the sensor housing 86. An O-ring 108 assists in sealing the connection between the sensor housing 86 and the sensor body. A set of screws 110 further assist in the mounting of the sensor housing to the sensor body. The portion of the sensor outside the housing preferably forms an insertion portion 111 for insertion into the assembly 102.

Within the sensor housing 86 is a connector 112 for receiving the cable 92, a cover plate 114 having a hole 116 for receiving the connector 112, an assembly for assisting in the sensing 118, such as a UV sensor, and an O-ring 120 for sealing these parts and providing a tighter fit between the sensor housing and its components. The components are further secured to the sensor housing via an internal retaining ring 122.

In operation, fluid to be treated flows into inlet port 18 and is contained within treatment vessel 12 until it flows out of the vessel 12 via outlet port 20. Flange plates 14 and 16 are sealed to vessel 12 and the one or more light emitting assemblies 22 to prevent fluid from escaping through the ends of treatment vessel 12. When the light emitting assembly 22 receives electrical power, the assembly 22 radiates ultraviolet light (UV) within treatment vessel 12, thereby irradiating fluid within vessel 12 with UV energy. Fitting 24 provides access for monitoring the amount of UV light irradiating the fluid contained within by means of the assembly 102 which is installed into fitting 24. O-ring 40 prevents fluid from escaping past the outside diameter of sensor port cup 26.

The handle 46 is actuated to rotate disc 50 and O-ring 66 relative to sensor port cup 26 and keyed plate 54 about the main cylindrical axis of assembly 102 such that hole 36 is aligned with eccentric recess 82, or in fact any orientation in which O-ring 66 does not overlap the diameter of hole 34. O-ring 66 forms a seal between groove 70 and the bottom of the internal cavity of port cup 26 to prevent fluid from escaping along a path between hole 34 and hole 36 regardless of whether or not a device such as sensor assembly 68 is sealingly installed into hole 36.

While in the servicing position, hole 81 in handle 46 is aligned with hole 44 in tab 42, allowing for the installation of means such as a padlock to prevent an alteration of this orientation in which fluid is prevented from escaping hole 34. The sensor 68 of FIG. 2 with ridge 64 can only be installed into assembly 102 when the longitudinal axis of through-hole 36 is aligned with the center of eccentric recess 82 in keyed plate 54 as shown in FIG. 3, so as to allow ridge 64 to pass through recess 82. In any other orientation the large diameter of ridge 64 longitudinally interferes with keyed plate 54 to prevent sensor 68 from being threaded into disc 50. Once sensor 68 is installed into assembly 102 such that ridge 64 has passed completely through recess 82, any rotational orientation in which hole 36 and eccentric recess 82 are not aligned causes entrapment of a portion of ridge 64 between keyed plate 54 and disc 50, thereby preventing sensor 68 from being removed.

The alignment of hole 36 with eccentric recess 82 ensures that sensor 68 can only be installed, or removed, when O-ring 66 is in a position to block fluid passage between hole 34 and 36. During installation of sensor 68 into assembly 102, once ridge 64 has passed completely through recess 82 the smaller diameter portion of sensor body 76 is radially adjacent to keyed plate 54 to avoid interference with plate 54 and allow rotation of disc 50. If ridge 64 has not completely passed through recess 82 then the large diameter of ridge 64 will radially interfere with keyed plate 54 to prevent rotation of disc 50. With sensor 68 threaded into assembly 102 such that there is no interference with keyed plate 54, handle 46 may be actuated to rotate disc 50, O-ring 66, and sensor 68 relative to sensor port cup 26 and keyed plate 54 about the main cylindrical axis of assembly 102:

This rotation may be continued until the operational position of FIG. 4 so that hole 36 is concentrically aligned with hole 34. With hole 36 concentrically aligned with hole 34, the sensor 68 may be further screwed into assembly 102 such that window 84 will protrude into or through hole 34. In order to assist with the proper functioning of the invention, O-ring 88 is preferably in sealing contact with the appropriate smooth bore portion of hole 36 at all times when ridge 64 has completely passed through recess 82 so that fluid in the vessel is prevented from escaping through hole 36 at times when -ring 66 may overlap hole 34. This rotational alignment of hole 36 with hole 34 also causes window 84 of sensor 68 to be in concentric alignment with hole 34, thereby allowing window 84 to be exposed to a portion of UV energy radiating from one or more of the light emitting assemblies 22. The amount of UV energy reaching window 84 will depend on the condition of the light emitting assemblies 22 and a light absorption characteristic of the fluid contained within vessel 12 and provides some indication of the effectiveness of the fluid treatment process. Sensor 68 contains a UV light sensitive element and necessary electronics to process and transmit a signal representative of the amount of light falling incident upon window 84.

After a period of operation of the fluid treatment system, it will be required to remove sensor 68 from assembly 102 for maintenance such as cleaning of window 84. This is achieved by unscrewing sensor 68 from rotating disc 50 to the depth where it has no portion protruding into hole 34 of sensor cup 26. This depth may be determined by unscrewing sensor 68 until ridge 64 comes into contact with keyed plate 54, and then screwing sensor 68 back into disc 50 by some small amount, for example one half of a turn, so that ridge 64 is no longer in contact with plate 54. Handle 46 is then actuated to rotate disc 50, O-ring 66, and sensor 68 relative to sensor port cup 26 and keyed plate 54 about the main cylindrical axis of assembly 102 from the operational position to the servicing position such that hole 36 is aligned with eccentric recess 82, allowing sensor 68 to be completely unscrewed from assembly 102 while O-ring 66 sealingly isolates hole 36 from hole 34 to prevent escape of fluid. A reference or standby sensor may be immediately reinstalled into assembly 102 without interrupting the fluid treatment process to allow the monitoring of UV light to quickly resume or to provide a means of quickly assessing the proper operation of the original sensor 68 which may then be taken out of service for any required maintenance or calibration. As will be appreciated, one or more of fitting 24, assembly 102, or sensor assembly 68 may be designed to protrude some distance beyond the inner surface of treatment vessel 12 so as to provide monitoring of the amount of UV light reaching an alternative interior location of treatment vessel 12.

Turning to FIG. 6, a view of a sensor sleeve is shown. As described above, the sensor 68 is preferably designed to include means for fitting within the holes 34 and 36 of the assembly 102. However, it will be understood that not all sensors may have similarly sized components. In order to allow these sensors 132 to be used with the monitoring port assembly, the sleeve 130 is used. The sleeve 130 includes a cap 134 which encloses the sensor 132 within a sleeve body, or housing, 136. The cap 134 or the sleeve body 136 preferably includes a hole whereby a cable 138 connected to the sensor 132 may pass through.

In use, the sensor 132 is placed within the sleeve body 136 and the sleeve body is then mounted to the rotating port monitoring assembly in a manner as described above with respect to sensor 68. As can be seen from FIG. 6, the sensor sleeve 130 includes an insertion portion 111 for connecting the sleeve 140 to the rotating port monitoring assembly.

In an alternative embodiment of the system, one or both of the inlet port 18 or outlet port 20 may be oriented such that it is substantially parallel to the treatment vessel 12; one or more UV emitting assemblies 22 may be angled within treatment vessel 12 so that they may penetrate the sides of fluid treatment vessel 12 with suitable sealing means to maintain the fluid tight integrity for treatment vessel 12. Furthermore, technologies other than mercury vapor lamps may be utilized for generating UV light, for example a UV excimer (excited dimer) lamp technology. Alternatively, the light emitting assembly 22 may include a device that generates light in a part of the spectrum that is not considered ultraviolet, for example an HID lamp. Another variation of the reactor chamber may include one or more chemical injection ports located in the treatment vessel or upstream of the treatment vessel, with some or all of the light emitting assemblies being omitted. In the most simplistic alternative form, the reactor chamber may just be comprised of a fluid-carrying pipe with fitting 24.

Alternatively to threads 38, sensor port cup 26 may have one or more holes through an outer flange for the purposes of accepting machine screws to secure it to matching holes on fitting 24, and the one or more holes may be spaced so as to provide only one possible rotational orientation of cup 26 relative to port 24. Also, a small hole through the face of the first end of sensor port cup 26 may be included to accept a screw or pin for rotationally fixing keyed plate 54 relative to sensor port cup 26. In lieu of a groove for retaining ring, two or more small blind holes through the face of the first end of sensor port cup 26 may be used to accept screws or pins for rigidly fixing keyed plate 54.

Fitting 24 may be installed on some alternative type of fluid treatment vessel compared to that described in FIG. 1. The alternative fluid treatment vessel may contain some means other than light emitting assemblies to interact with the fluid being treated: other means may be a chemical injected into the treatment vessel or injected upstream of the treatment vessel. Sensor 68 may be designed to provide signals pertinent to the alternative fluid treatment process, for example (but not limited to) chemical concentration, fluid PH, or fluid conductivity. Fitting 24 may alternatively be installed in a fluid carrying pipe, with sensor assembly 68 designed to provide signals pertinent to one or more physical parameters of fluid flowing within the pipe, for example (but not limited to) flow velocity, flow rate, chemical concentration, fluid PH, or fluid conductivity. Fitting 24 may alternatively be installed into a fluid containing tank, with sensor assembly 68 designed to provide signals pertinent to one or more physical parameters of fluid contained within the tank, for example (but not limited to) chemical concentration, fluid PH, or fluid conductivity. Such fluid containing tank may be equipped with a light emitting assembly, in which case sensor 68 would be designed to be sensitive to light radiating through the fluid. Keyed plate 54 may have an enlarged outside diameter with through holes to accept securing screws that thread into matching holes in the first end face of sensor cup 26, thereby eliminating the need for retaining ring and its associated groove on the inside of sensor port cup 26. The bushing 52 between rotating disc 50 and keyed plate 54 may be of a longer length so as to cause a large enough longitudinal gap between disc 50 and plate 54 to receive ridge 64, thereby eliminating the need for hole 36 to be shaped to receive ridge 64. Sensor cup 26 may have through-holes substantially parallel to its main cylindrical axis to accept securing screws that thread into matching holes in fitting 24, thereby eliminating the need for threads 38. Conversely, fitting 24 may be raised sufficiently and equipped with threaded through-holes perpendicular to its main cylindrical axis for the purpose of accepting screws that will engage into matching blind holes or a profile on the outer surface of sensor cup 26, thereby eliminating the need for threads 38. Sensor cup 26 may be integral with and non-removable from fitting 24, eliminating the need for securing means such as threads 38 and O-ring seal 40.

In an alternative embodiment, the ball plunger may be a single prefabricated assembly that threads into hole 78.

Alternative sensor assemblies may be designed to monitor fluid parameters other than ultraviolet light, for example temperature, PH, conductivity, visible light, infrared light, flow velocity, or flow rate. Also, a single sensor assembly may be designed to monitor more than one fluid process parameter, for example UV light and temperature. Power for the electronics contained within the sensor housing 86 may be derived from sources other than the cable 92, such as battery or photodiode array. Signals may be transmitted to and from the sensor by means other than cable 92, for example wireless radio frequency.

Alternatively, instead of using cables 94, control information may be transmitted via other communication techniques, such as wireless radio frequency.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A monitoring port assembly for use in a fluid treatment vessel, the assembly being configured for installation in an opening in a wall of the fluid treatment vessel, the monitoring port assembly comprising:
a sensor port cup having a port permitting direct access to an interior of the fluid treatment vessel when the monitoring port assembly is installed therein, the port being offset from a central longitudinal axis of the sensor port cup; and
a cylindrical body having an offset through-hole to receive a sensor assembly, the cylindrical body being disposed within the sensor port cup for rotational movement about the central longitudinal axis between an operational position where the offset through-hole is aligned and coincident with the port to position the sensor assembly for direct contact with fluid in the interior of the fluid treatment vessel when the monitoring port assembly is installed therein, and a servicing position where the offset through-hole is displaced relative to the port and the cylindrical body sealingly engages the sensor port cup to permit installation or removal of the sensor assembly and to prevent fluid egress from the fluid treatment vessel when the monitoring port assembly is installed therein.

2. The monitoring port assembly of claim 1, further comprising a keyed plate having a keying structure aligned with the port to permit insertion or removal of the sensor assembly when the cylindrical body is in the servicing position.

3. The monitoring port assembly of claim 2, wherein the keyed plate is an annular plate fixed to an upper surface of the sensor port cup, and the keying structure is a cutout in the inner circumference of the annular plate.

4. The monitoring port assembly of claim 2, wherein the keyed plate retainingly overlaps a flange of the sensor assembly when the cylindrical body is in the operational position.

5. The monitoring port assembly of claim 1, wherein the through-hole is threaded to cooperate with a threaded exterior of the sensor assembly.

6. The monitoring port assembly of claim 1, further comprising a handle fixed to the cylindrical body.

7. The monitoring port assembly of claim 6, wherein the handle and sensor port cup include cooperating means to positively indicate the operational and servicing positions.

8. The monitoring port assembly of claim 7, wherein the cooperating means include stops.

9. The monitoring port assembly of claim 1, wherein the sensor port cup is bolted to a fitting in the fluid treatment vessel.

10. The monitoring port assembly of claim 1, wherein the sensor port cup is integral with the fluid treatment vessel.

11. The monitoring port assembly of claim 1 for use in a ultra-violet water treatment system.

12. The monitoring port assembly of claim 1, wherein the sensor assembly comprises an insertion portion complementary to an interior profile of the through-hole.

13. The monitoring port assembly of claim 12, wherein the insertion portion terminates at a sealed sensor tip.

14. The monitoring port assembly of claim 13, wherein the sensor tip includes a window.

15. The monitoring port assembly of claim 13, wherein the insertion portion has sections of differing diameter decreasing towards the sensor tip.

16. The monitoring port assembly of claim 12, wherein the insertion portion includes a seal to sealingly engage the through-hole when the sensor assembly is partially inserted.

17. The monitoring port assembly of claim 12, wherein the insertion portion includes a flange.

18. The monitoring port assembly of claim 12, further comprising an ultra-violet sensor.

19. The monitoring port assembly of claim 12, further comprising a housing for receiving a calibration sensor.

* * * * *